J. M. Stoner,
Corn Planter.

No. 91,786. Patented June 22, 1869.

Witnesses.
Larry King.
Leopold Ewing.

Inventor.
Jacob M. Stoner.
per Alexander Mason.
Atty.

United States Patent Office.

JACOB M. STONER, OF GREENVILLE LODGE, PENNSYLVANIA.

Letters Patent No. 91,786, dated June 22, 1869.

IMPROVEMENT IN CORN-FERTILIZER AND PLANTER.

The Schedule referred to in these Letters Patent and making part of the same.

*To all whom it may concern:*

Be it known that I, JACOB M. STONER, of Greenville Lodge, in the county of Franklin, and in the State of Pennsylvania, have invented new and useful Improvements in Corn-Planter and Fertilizer; and do hereby declare that the following is a full, clear, and exact description thereof, reference being had to the accompanying drawings, and to the letters of reference marked thereon.

The nature of my invention consists in the construction of a "combined corn-planter and fertilizer," by the use of which the corn and the fertilizing-compound are deposited at the same time in the ground.

In order to enable others skilled in the art to which my invention appertains, to make and use the same, I will now proceed to describe its construction and operation, referring to the annexed drawings, which form a part of this specification, and in which—

Figure 1:
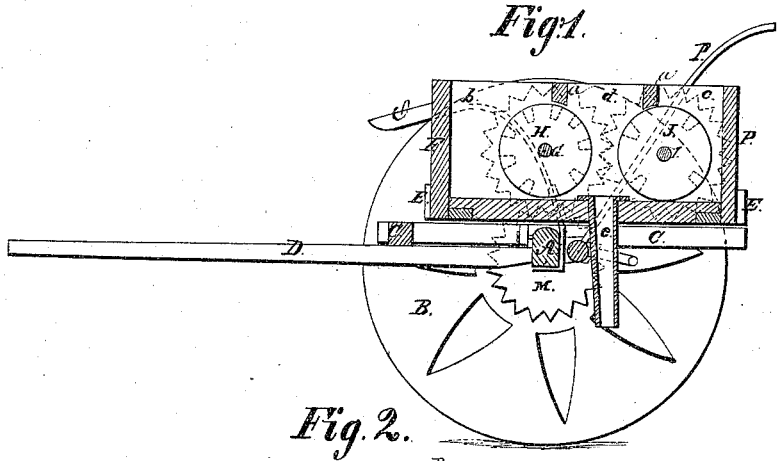

Figure 1 is a vertical section, and

Figure 2:
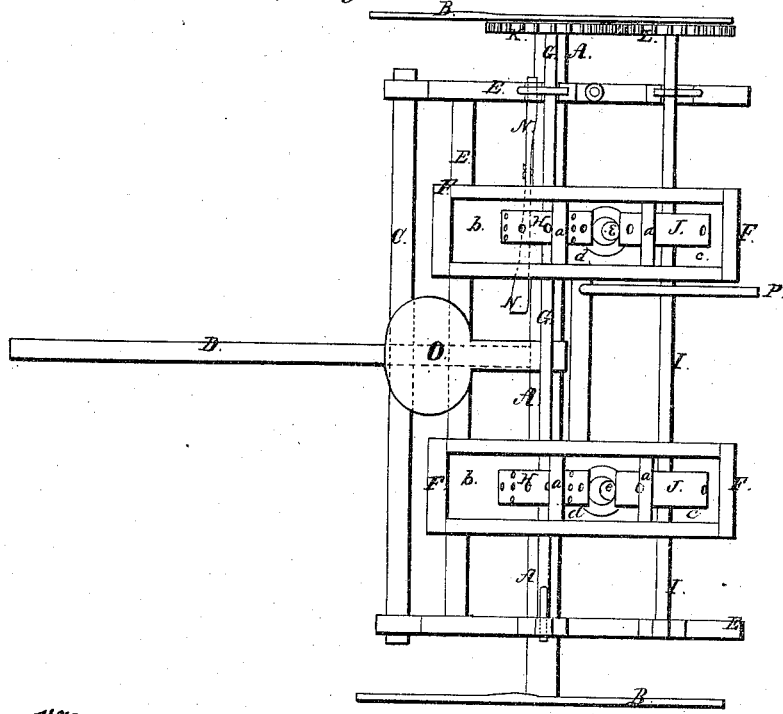

Figure 2, a plan view of my machine.

A represents the axle, having at each end a wheel, B;

C is a frame secured to said axle; and

D is the tongue.

On the frame C is placed a movable frame, E, having two boxes, F F, secured to the same. These boxes are each, by two partitions $a\ a$, divided into three chambers or receptacles.

The front chamber $b$ contains the corn to be planted; the rear chamber $c$ contains the fertilizer; and the middle chamber $d$ has a tube, $e$, through its bottom, for the passage to the ground of the corn and fertilizer, brought, by means hereinafter to be described, to said chamber and tube from the end chambers.

A shaft, G, which has its bearings in the end-pieces of the frame E, passes through the boxes F F, near the rear ends of the chambers $b\ b$.

On the shaft G, in the chamber $b$, is placed a roller, H, the partition $a$, dividing said chamber from the middle chamber $d$, being cut out sufficiently to allow the passage of said roller, but at the same time to prevent any grains of corn from passing between the roller and the partition.

The roller H is provided on its periphery with a series of holes large enough to carry one grain of corn; or if it is desired to plant more than one grain at a time, two or three holes may be made in a row across the roller, as seen in fig. 2.

If the shaft G is revolving toward the rear, the holes in the roller H take up each one grain, and as the roller turns, these grains are conducted into the chambers $d$, and drop down through the tube $e$.

In like manner, by means of the shaft I and rollers J J, which are also provided with a series of holes on their periphery, the fertilizer is brought from the chamber $c$, and deposited in the ground through the tube $e$ at the same time as the corn is.

The shafts G and I are revolved by means of cog-wheels K and L attached to the ends of said shafts, respectively, the two cog-wheels gearing into each other, and the wheel K also with a cog-wheel, M, on the hub of one of the wheels B, so that the regular movement of the machine sows the corn and fertilizer at the same time in the ground.

To the axle A is pivoted a lever, N, one end of which is placed at such a point that the driver, seated at the seat O, can put his foot on the same.

The other end of the lever N is inserted under the end of the frame E where the cog-wheels are placed, so that when the driver steps on the lever, that end of the frame E will be raised sufficient to throw the cog-wheel K out of gear with the wheel M.

The corn and fertilizer, after being deposited in the ground, are covered by shovels, made in the form of grain-drill shovels, and attached in any suitable manner, and raised or lowered by means of a lever, P, placed so as to be within reach of the driver.

Having thus fully described my invention,

What I claim as new, and desire to secure by Letters Patent, is—

1. The box F, divided, by means of partitions $a\ a$, into three chambers, a corn-receptacle, $b$, fertilizer-receptacle, $c$, and depositing-chamber, $d$, having a tube or spout $e$, leading downward into the ground, substantially as shown and described.

2. The arrangement within the box F, constructed as described, of the rollers H and J on the respective shafts G and I, so as to deposit the corn and fertilizer at the same time, substantially as herein set forth.

3. The arrangement of the shafts G and I, cog-wheels K and L, and cog-wheel M, on the hub of the driving-wheel, substantially as shown and described.

4. The arrangement of the frame E, boxes F F, with their appurtenances and the lever N, substantially as and for the purposes herein set forth.

In testimony that I claim the foregoing, I have hereunto set my hand, this 10th day of April, 1869.

JACOB M. STONER.

Witnesses:
SAMUEL FREET,
W. W. BRITTON.